May 8, 1923.　　　　　　　　　　　　　　　　　　1,454,282
H. E. HOLBROOK

DETACHABLE WHEEL MOUNTING

Filed May 10, 1922

INVENTOR.
Henry E. Holbrook
By Ira J. Wilson
ATTY.

Patented May 8, 1923.

1,454,282

UNITED STATES PATENT OFFICE.

HENRY E. HOLBROOK, OF BOSTON, MASSACHUSETTS.

DETACHABLE WHEEL MOUNTING.

Application filed May 10, 1922. Serial No. 559,733.

*To all whom it may concern:*

Be it known that I, HENRY E. HOLBROOK, a citizen of the United States, residing at Boston, in the county of Suffolk and State of Massachusetts, have invented certain new and useful Improvements in Detachable Wheel Mountings, of which the following is a specification.

Portable cribs and many other articles are equipped with wheels upon which they may be rolled about, and in many instances it is desirable that the wheels be detachable from the article which they carry for convenience in shipment and for other purposes. The detachability of the wheels is particularly desirable in folding portable cribs, for instance, which are adapted to be collapsed into a small bundle for shipment, and when so collapsed, it is highly desirable that the wheels be removed and packed inside the crib, not only to reduce the space which will be occupied in shipment, but also in order to obviate danger of injury to the wheels and their mountings.

The primary purpose of my present invention is to provide a mounting for wheels of this character which shall be so constructed that the wheels may be shipped disconnected from the crib or other article, and may be quickly and easily attached thereto by the purchaser and without the employment of tools, or other accessories.

With this end in view, I have provided a detachable wheel mounting which is simple in construction, economical to manufacture, strong and durable, and one which may be quickly applied and locked in position against accidental displacement, and which may also be readily dismantled should occasion require.

A preferred embodiment of the invention is illustrated in the accompanying drawings, and referring thereto:—

Figure 1:
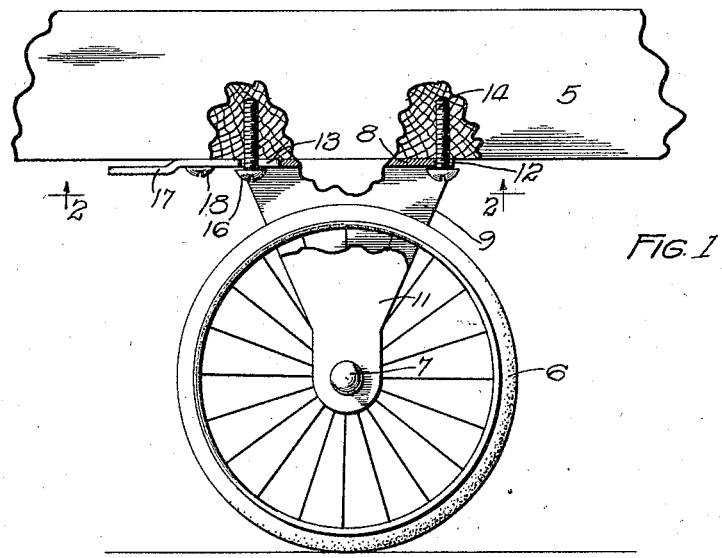
Fig. 1 is a side elevation partially in section of a mounting embodying my invention.

Referring to the drawings more in detail, reference character 5 indicates a frame member which may form a part of any portable article, such for instance, as a child's portable crib. Such a frame is equipped usually with four wheels, but since the article of furniture itself and the number of wheels employed is immaterial, so far as my present invention is concerned, I have illustrated herein but one wheel of the number.

The wheel itself, indicated by reference character 6, may be of any preferred construction, such for instance as a rubber tire wheel having wire spokes, and it may be mounted upon an axle 7 equipped with ball-bearings, or not, as preferred. The wheel is shown as mounted in a substantially U-shaped yoke, comprising the top plate 8 and the depending legs 9 and 11 between which the wheel is disposed.

One edge of the top plate 8 is provided with a relatively shallow slot 12 and the opposite edge is provided with a plurality of longer slots 13. While the number of slots in the plate may be varied, I have found that one short and two long slots, as illustrated, is preferable. Into the bottom of the frame member 5 are screwed three screws 14, 15 and 16, each disposed in alinement with one of the slots in the plate, and the screw 14 being spaced from the screws 15 and 16 a distance slightly less than the width of the plate 8. The heads of these screws project downwardly from the bottom of the frame a sufficient distance to accommodate the top plate between the heads and the frame.

Figure 3:
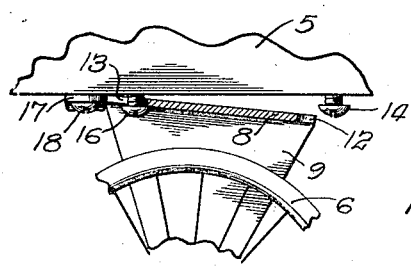
Fig. 3 is a fragmentary sectional view showing the manner in which the mounting is attached.

In attaching the mounting to the frame the slots 13 are first engaged with their respective screws 15 and 16, as illustrated in Fig. 3, the bracket being moved to the left viewing this figure sufficiently to permit the forward edge thereof to clear the screw 14. It is then disposed flatly against the bottom of the frame and slid to the right, viewing Fig. 3, so as to engage the slot 12 with the screw 14, thus connecting the mounting to the frame.

Figure 2:
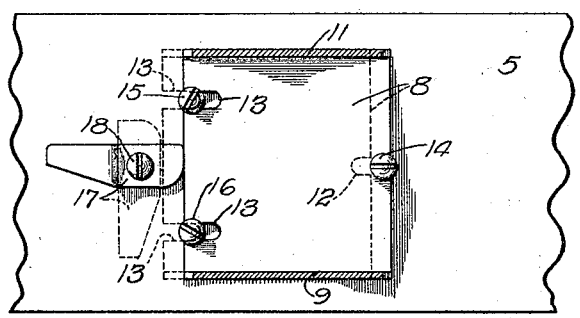
Fig. 2 is a sectional view on the line 2—2 of Fig. 1.

For the purpose of locking the mounting against accidental displacement, I have provided a cam-shaped lever 17 pivoted upon a fulcrum screw 18 rearwardly of the plate, in the position shown in Fig. 2. When the mounting is being attached to the frame this cam lever or latch is disposed in the dotted line position shown in Fig. 2, and when the attachment of the mounting has been effected, the lever is swung into the full line position shown in Fig. 2 so as to abut against the rear edge of the top plate 8 and prevent disengagement of the plate from the screw 14. It will be obvious that the mounting is thus securely locked in position but may be detached by simply releasing the lever 17 and reversing the operations previously described.

It should be apparent that I have provided a mounting which is extremely simple in construction, and one which may be readily assembled or attached to an article and as readily disconnected therefrom. Furthermore when connected, the device is securely locked against accidental displacement, and both the assembling and disconnecting operations may be performed without the employment of tools of any character.

The structural details of the invention may obviously be varied considerably without departing from the spirit of the invention as defined in the following claim.

I claim:

A wheel mounting comprising a wheel carrying member having a flat face provided with open ended slots extending inwardly different distances from opposite edges thereof, a frame structure, a plurality of headed screws projecting from said frame structure in position to be simultaneously engaged in said slots, said slots being so proportioned that the member may be slid in one direction with the forward slots in engagement with the screws until the rear edge thereof clears the other screw and and may then be slid in the reverse direction a shorter distance limited by the depth of the rear slot, whereby all of the screws are simultaneously engaged in their respective slots, and a locking device for preventing disengaging movement of said member relatively to the screws.

HENRY E. HOLBROOK.